United States Patent [19]
Dabrowski

[11] Patent Number: 6,038,884
[45] Date of Patent: Mar. 21, 2000

[54] AIR-CONDITIONING CONDENSER PROVIDED WITH AN EXCHANGEABLE FLUID RESERVOIR

[75] Inventor: Laurent Dabrowski, Versailles, France

[73] Assignee: Valeo Thermique Moteur, La Verriere, France

[21] Appl. No.: 09/185,757

[22] Filed: Nov. 4, 1998

[30] Foreign Application Priority Data

Nov. 5, 1997 [FR] France .................................. 97 13919

[51] Int. Cl.⁷ .................................................. F25B 39/04
[52] U.S. Cl. .............................. 62/509; 165/110; 165/132
[58] Field of Search ...................... 62/509, 507; 165/110, 165/132

[56] References Cited

U.S. PATENT DOCUMENTS

| 3,051,450 | 8/1962 | White et al. ............................. 257/125 |
| 5,159,821 | 11/1992 | Nakamura .................................. 62/509 |
| 5,505,253 | 4/1996 | Heraud .................................... 165/110 |
| 5,546,761 | 8/1996 | Matsuo et al. ............................. 62/509 |
| 5,709,106 | 1/1998 | Inaba et al. ................................ 62/507 |
| 5,868,002 | 2/1999 | Matsubayashi ............................. 62/507 |
| 5,884,503 | 3/1999 | Inaba ......................................... 62/509 |

FOREIGN PATENT DOCUMENTS

| 0 480 330 | 4/1992 | European Pat. Off. . |
| 0 769 666 | 4/1997 | European Pat. Off. . |
| 0 838 642 | 4/1998 | European Pat. Off. . |
| 342589 | 1/1960 | Switzerland . |

OTHER PUBLICATIONS

Patent Abstracts of Japan vol. 018, No. 550 (M–1690), Oct. 20, 1994 & JP 06 194005 A (Honda Motor Co. Ltd), Jul. 15, 1994.

French Search Report dated Jul. 24, 1998.

*Primary Examiner*—Henry Bennett
*Assistant Examiner*—Marc Norman
*Attorney, Agent, or Firm*—Morgan & Finnegan, L.L.P.

[57] ABSTRACT

An air-conditioning condenser has a reservoir screwed axially into a base which itself is brazed onto a header box of the condenser. The reservoir communicates with the header box through pipes formed in the base. The condenser is suitable for use in the air conditioning apparatus for automobile passenger compartments.

17 Claims, 2 Drawing Sheets

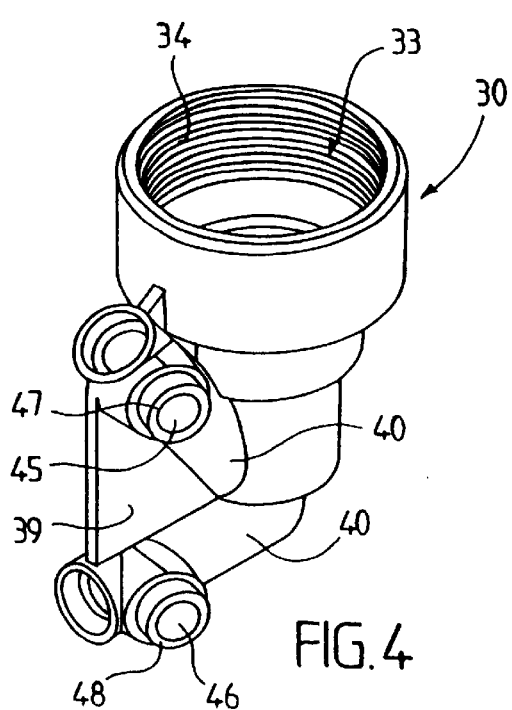
FIG.4
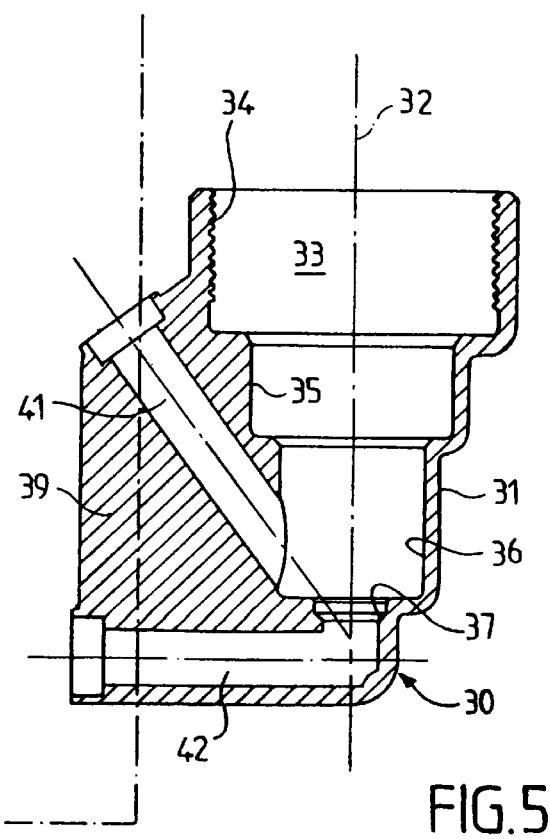
FIG.5
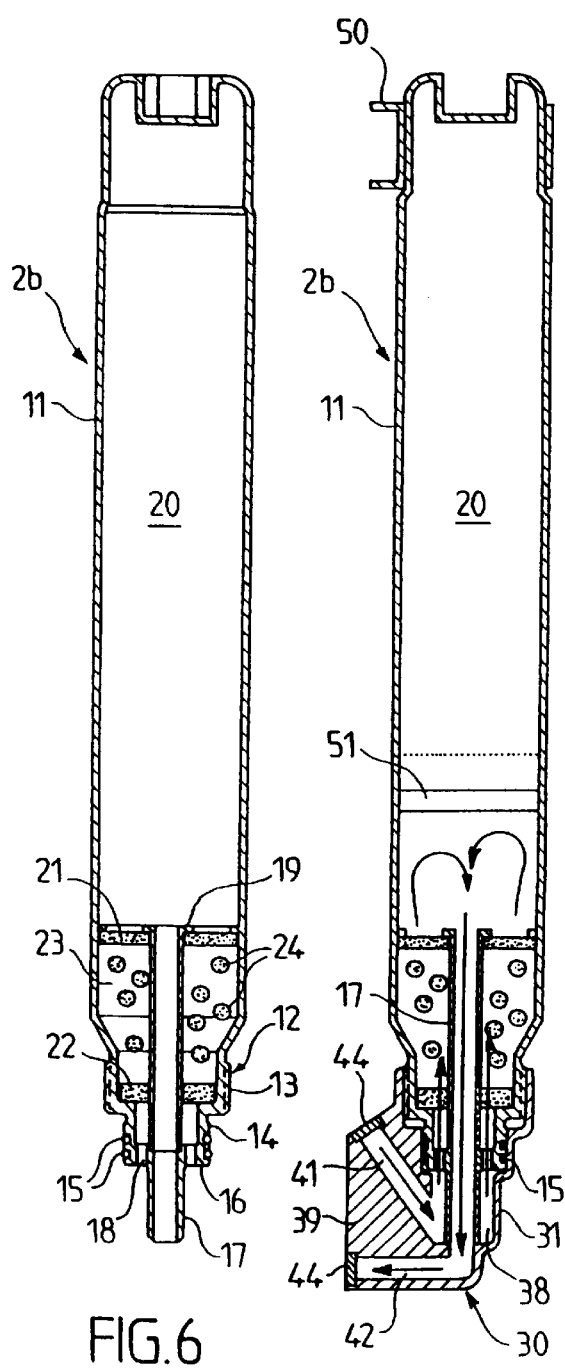
FIG.6
FIG.7

AIR-CONDITIONING CONDENSER PROVIDED WITH AN EXCHANGEABLE FLUID RESERVOIR

FIELD OF THE INVENTION

The invention concerns a condenser, notably for a refrigerating fluid in a device for air-conditioning the passenger compartment of an automobile, comprising a header box and an elongate intermediate reservoir for processing and/or accumulating a fluid, connected to the header box by connecting pipes.

BACKGROUND OF THE INVENTION

In such a condenser, as is well known, the intermediate reservoir can fulfil all or some of the following functions: filtration and/or dehydration of the refrigerating fluid, compensation for the variations in volume thereof, and separation of the liquid and gaseous phases. Its intermediate position with respect to the condenser makes it possible to circulate only fluid in the liquid state in the part of the condenser situated downstream of the reservoir, said fluid thus being sub-cooled below the liquid/gas equilibrium temperature, improving the condenser performance and making it relatively independent of the quantity of fluid contained in the circuit.

EP-A-0 480 330 describes, in a vehicle air-conditioning condenser, an intermediate reservoir which is removably fixed to a base secured to the header box, with the two connecting pipes passing through it.

This reservoir is provided at its lower end with a head secured to its wall, which is fixed to the base by means of a screw. The connecting pipes extend partly in the base and partly in the reservoir head.

This known design is relatively complex and bulky. In addition, in order to replace the reservoir, it is necessary to unscrew the fixing screw, which may entail serious difficulties according to the accessibility in the vehicle.

SUMMARY OF THE INVENTION

The invention relates notably to a condenser comprising a header box and an elongate intermediate reservoir for processing and/or accumulating a fluid, which is removably fixed to a base secured to the header box, passed through by two connecting pipes for the transfer of fluid between the header box and the reservoir.

According to the invention, the reservoir is provided at or near one end with an axial thread which cooperates with the base to fix the reservoir thereto, said connecting pipes extending therein to a point opposite said one end.

Optional characteristics of the invention, complementary or alternative, are set out below:

The header box is elongate side by side with the reservoir and the reservoir is connected to the header box by a support flange at or near its other end.

The reservoir has an axial fluid passage nozzle which projects at said one end to connect it to the inside of the base at a first of said connecting pipes.

The reservoir has, at said one end, fluid passage openings surrounding said axial tube and communicating with the second of said connecting pipes.

The first pipe extends substantially perpendicularly to the longitudinal direction of the reservoir.

The second pipe is oblique with respect to the longitudinal direction of the reservoir, and extends away from the first pipe in the direction of the header box.

The first and second pipes are disposed respectively downstream and upstream of the reservoir.

The reservoir has a transverse partition permeable to fluid, delimiting between it and said other end a fluid accumulation volume sheltered from the turbulence produced by the circulation of the fluid.

The base is brazed to the external face of a tubular wall delimiting the header box.

The connecting pipes extend substantially tangentially with respect to said tubular wall and open out laterally through it.

The characteristics and advantages of the invention will be disclosed in more detail in the following description with reference to the accompanying drawings.

BRIEF DESCRIPTION OF THE DRAWINGS

FIG. 4 is a perspective view of the base of the condenser of FIGS. 1 and 2;

FIG. 5 is a view of the base in median section;

FIG. 6 is a view of the reservoir in axial section; and

FIG. 7 is a view similar to FIG. 6, relating to a variant of the reservoir and also showing the base.

DESCRIPTION OF THE PREFERRED EMBODIMENTS OF THE INVENTION

Figure 3:
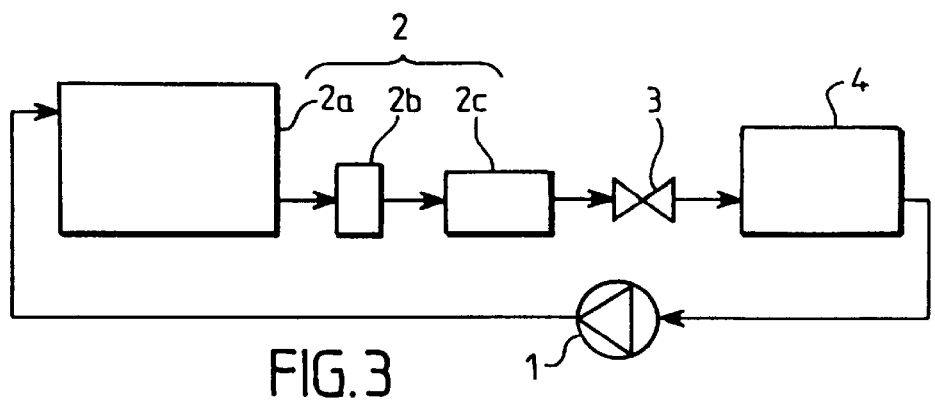
FIG. 3 is a diagram of a refrigerating fluid circuit incorporating the condenser.

FIG. 3 is a diagram of a refrigerating fluid circuit forming part of an automobile passenger compartment air-conditioning device. In a known fashion, this circuit comprises in succession a compressor 1, an assembly 2 referred to hereinafter as a condenser, a pressure reducer 3 and an evaporator 4. The condenser 2 has an upstream section 2a in which the refrigerating fluid yields up heat to an air flow so as to condense, after having, when necessary, being "de-superheated" from an inlet temperature higher than the liquid/gas equilibrium temperature. The section 2a is followed by an intermediate reservoir 2b, then by a downstream section 2c in which the fluid is sub-cooled by heat exchange with the air flow.

Figure 1:
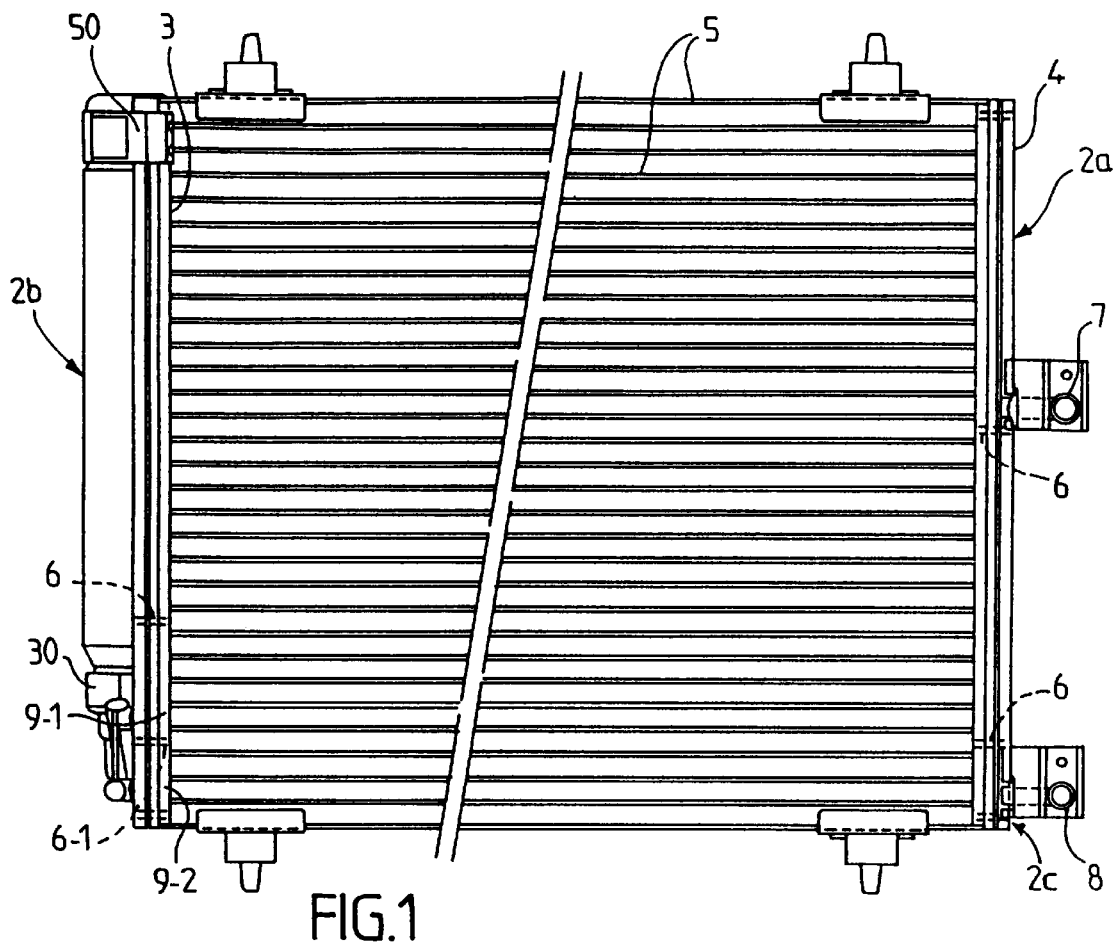
FIG. 1 is a front view of a condenser according to the invention.
Figure 2:
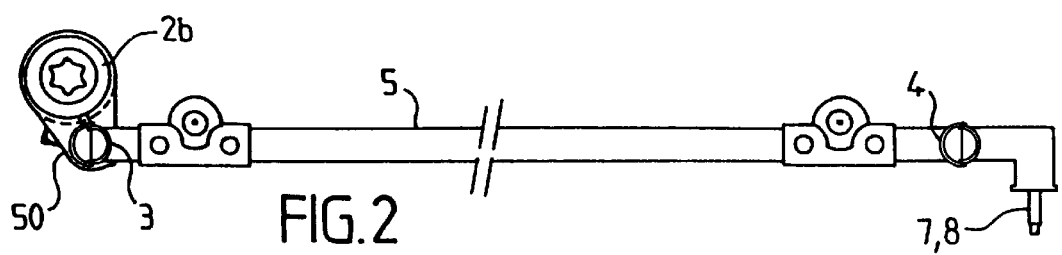
FIG. 2 is a plan view of this condenser.

An example of the condenser 2 is shown, in its general structure, in FIGS. 1 and 2. It comprises two header boxes 3, 4 elongated vertically and separated from each other in a horizontal direction, connected together by a multiplicity of horizontal fluid circulation tubes 5. Each header box is divided into different chambers by horizontal partitions 6 so that the fluid circulates, in the tubes 5, alternately from a chamber in the header 3 to a chamber in the header 4 and vice versa, from the top chamber of the header 4, which communicates with an inlet nozzle 7, as far as the bottom chamber of the same box 4, which communicates with an outlet nozzle 8.

One of the intermediate partitions of the header box 3, designated by the reference 6-1, separates, chambers 9-1 and 9-2, situated respectively above and below the partition 6-1, and which communicate with each other solely by means of the reservoir 2b, which is elongated vertically and extends along the box 3.

As can be seen more particularly in FIGS. 6 and 7, the reservoir 2b comprises a casing formed by a cylindrical body 11 occupying the major part of its height, and a narrowed neck 12 disposed at its lower part. The neck 12 has in its turn a region 13 provided with a male thread and, below this threaded region, a region 14 with a smaller diameter, recessed by two circumferential grooves housing two O-ring seals 15. At its bottom end, the reservoir 2b has a transverse end wall 16 with, passing through it, on the one hand an axial nozzle 17 which projects upwards inside the reservoir and downwards outside it, and on the other hand by openings 18 surrounding the nozzle 17. The nozzle 17 extends upwards as far as a perforated intermediate partition 19, which it passes through in order to emerge in a free volume 20 lying between the partition 19 and the top end of the reservoir and extending over the major part of the height of the latter. Two washers 21, 22 permeable to fluid, surrounding the nozzle 17 and bearing respectively upwards on the partition 19 and downwards on a shoulder connecting the regions 13 and 14, delimiting between them an annular processing volume 23 provided with particles 24 able to filter and/or dehydrate the fluid.

The reservoir 2b is in mechanical connection and fluid communication with the header box 3 by means of a base 30 which is depicted in detail in FIGS. 4 and 5. This base is preferably a piece cast from aluminium alloy, defined in a wall 31 formed substantially by revolution about a vertical axis 32, which delimits a housing 33 open upwardly for the neck of the reservoir 2b. The lateral surface of the housing 33 has, in an upper region, a female thread 34 cooperating with the thread 13 on the reservoir. A cylindrical median region 35 cooperates with the seals 15, and a cylindrical lower region 36 surrounds the nozzle 17 and delimits with the latter, the free end of which bears on a seat 37 provided at the bottom of the housing 33, an annular space 38.

To the wall 31 there is connected a web 39 extending substantially in a plane passing through the axis 32. This web has, on each side of this plane, enlargements 40 which house two pipes 41, 42 elongated parallel to this plane. In an intermediate step of the manufacture of the base, as shown in FIG. 5, the pipe 41 opens out through both ends respectively into the housing 33, at the level of the annular space 38, and in the free edge of the web 39, and is inclined upwards from one towards the other. The pipe 42 extends horizontally from the free edge of the web to below the housing 33, where it forms an upward elbow in order to open out at the bottom of the housing, inside the annular seat 37. In the terminated base, brazed plugs 43, 44, shown in FIG. 7, sealingly close off the free ends of the pipes 41, 42, and the latter open out to the outside solely through passages 45, 46 provided in lateral protrusions 47, 48 formed on the swellings 40.

The base 30 is fixed to the header box 3 by brazing of the ends of the protrusions 47, 48, onto the external face of the tubular aluminium-sheet wall of the box, during the assembly of the condenser by brazing. The passages 45 and 46 communicate with the chambers 9-1 and 9-2 respectively of the fluid box through holes provided in the tubular wall. The condensed fluid reaching the chamber 9-1 passes from the latter to the annular space 38 through the passage 45 and inclined pipe 41, and then enters the reservoir 2b, screwed into the base, through the openings 18. It then passes through the volume 23, where it is dried and filtered by the particles 24, and accumulates in the volume 20, where any residual gaseous phase collects at the upper part. The fluid leaves the volume 20, solely in the liquid state, through the tube 17, and reaches the chamber 9-2 of the header box 3 through the horizontal pipe 42 and passage 46. Thus the tubes 5 and the chambers of the boxes 3 and 4 situated higher than the partition 6-1, including the chamber 9-1 constitute the upstream section 2a of the condenser, whilst the tubes and chamber situated lower than this partition, including the chamber 9-2, constitute the downstream section 2c.

A support flange 50 mechanically connects the top end of the reservoir 2b to that of the header box 3 for a more stable fixing of the reservoir.

FIG. 7 shows an optional partition 51 extending across the volume 20, at a short distance above the partition 19. The partition 51 is permeable to fluid and shelters the upper region of the volume 20 from turbulence, facilitating the gas/liquid separation.

Replacing the reservoir is particularly simple, since it suffices to unscrew the old reservoir and screw on a new one.

What is claimed is:

1. A condenser for an air conditioning device, comprising a header box a base secured to the header box and an elongate intermediate reservoir fixed to said base for the treatment and accumulation of a fluid, said base having a first and a second connecting pipes for the transfer of fluid between the header box and the intermediate reservoir, the intermediate reservoir having a first and a second ends and an axial thread substantially near said first end which cooperates with said base for fixing the intermediate reservoir, said connecting pipes extending to a point opposite said first end.

2. A condenser according to claim 1, wherein the header box is elongated side by side with the intermediate reservoir and the intermediate reservoir having a support flange which connects the intermediate reservoir to the header box.

3. A condenser according to claim 1, wherein the intermediate reservoir has an axial nozzle which projects upwards inside the intermediate reservoir and is connected to the inside of said base at the first connecting pipe.

4. A condenser according to claim 3, wherein the intermediate reservoir has a plurality of openings surrounding said axial nozzle which communicate with the second connecting pipe.

5. A condenser according to claim 1, wherein the first pipe extends substantially perpendicularly to the longitudinal direction of the intermediate reservoir.

6. A condenser according to claim 1, wherein the second pipe is oblique with respect to the longitudinal direction of the intermediate reservoir and extends away from the first pipe in the direction of the header box.

7. A condenser according to claim 1, wherein the first and second pipes are disposed respectively downstream and upstream of the intermediate reservoir.

8. A condenser according to claim 1, wherein the intermediate reservoir has a transverse partition permeable to fluid, delimiting between the transverse partition and said second end of the intermediate reservoir a fluid accumulation volume sheltered from the turbulence produced by the circulation of the fluid.

9. A condenser according to claim 1, wherein said base is brazed to an external face of a tubular wall delimiting the header box.

10. A condenser according to claim 9, wherein the first and second connecting pipes extend substantially tangentially with respect to said tubular wall and open out laterally through said tubular wall.

11. A condenser comprising:

a header box;

a base which is connected to the header box, said base having a first axial thread; and an intermediate reservoir having a second axial thread, said reservoir removably fixed to the base by cooperation of the first axial thread and the second axial thread.

12. A condenser according to claim 11, wherein the intermediate reservoir further includes a top end and a bottom end, a support flange connecting the top end to the header box, a plurality of O-ring seals housed below the second axial thread.

13. A condenser according to claim 11, wherein the base further includes a first pipe and a second pipe each having a first and a second free end for the distribution of fluid between the header box and the intermediate reservoir.

14. A condenser according to claim 13, wherein the first and second free ends of the first and the second pipes are sealed off by brazed plugs.

15. A condenser according to claim 13, wherein the base consists of a wall formed substantially by revolution of about a vertical axis which delimits a housing having a an axial side, a bottom portion and opens upwardly to receive the reservoir, the first pipe extends into the axial side of the housing and the second pipe extends below the housing and forms an upward elbow which opens into the bottom portion of the housing.

16. A condenser according to claim 11, further comprising means for connecting the intermediate reservoir to the header box and means for fixing the base to the header box.

17. A condenser, comprising:

a header box;

a base which is connected to the header box, said base including a vertical axis, a wall formed substantially around the vertical axis, a housing having an upper, a median and a lower regions, a seat located at the bottom of the housing;

a first and a second pipes located in the base, each pipe having a first free end and a second free end for the distribution of fluid between the header box and an intermediate reservoir, two brazed plugs, a plurality of passages and a plurality of lateral protrusions; and the intermediate reservoir removably fixed to the base, said intermediate reservoir including a top and a bottom ends, a support flange located at the top end, a cylindrical body, a neck, an axial thread, a plurality of O-ring seals housed below the axial thread, a transverse wall, an axial nozzle, an opening surrounding the nozzle, wherein the upper region of the base cooperates with the thread of the intermediate reservoir, the median region of the base cooperates with the O-ring seals of the intermediate reservoir and the support flange of the intermediate reservoir connects the top end of the reservoir to the header box.

* * * * *